United States Patent
Ganzi et al.

(10) Patent No.: US 7,604,725 B2
(45) Date of Patent: Oct. 20, 2009

(54) WATER TREATMENT SYSTEM AND METHOD

(75) Inventors: Gary Ganzi, Lexington, MA (US); Anil D. Jha, Lincoln, MA (US); Frederick Wilkins, Pepperell, MA (US); Evgeniya Freydina, Acton, MA (US); Aytac Sezgi, Bedford, NH (US); Reshma Madhusudan, Arlington Heights, IL (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 756 days.

(21) Appl. No.: 10/712,250

(22) Filed: Nov. 13, 2003

(65) Prior Publication Data

US 2005/0103630 A1  May 19, 2005

(51) Int. Cl.
*B01D 61/44* (2006.01)
*B01D 61/48* (2006.01)

(52) U.S. Cl. .................. 204/533; 204/536; 204/632; 204/633

(58) Field of Classification Search .............. 204/632, 204/524, 533, 536
See application file for complete search history.

(56) References Cited

U.S. PATENT DOCUMENTS

| | | |
|---|---|---|
| 2,514,415 A | 7/1950 | Rasch |
| 2,681,319 A | 6/1954 | Bodamer |
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |
| 2,854,394 A | 9/1958 | Kollsman |
| 2,923,674 A | 2/1960 | Kressman |
| 2,943,989 A | 7/1960 | Kollsman |
| 3,014,855 A | 12/1961 | Kressman |
| 3,074,864 A | 1/1963 | Gaysowski |

(Continued)

FOREIGN PATENT DOCUMENTS

AU    B-18629/92    10/1992

(Continued)

OTHER PUBLICATIONS

Yoran Oren et al.,"Studies on Polarity Reversal with Continuous Deionization," *Desalination*, Elsevier Scientific Publishing Co., Amsterdam, NL, vol. 86, No. 2, Jun. 1, 1992, pp. 155-171.

(Continued)

*Primary Examiner*—Arun S Phasge

(57) ABSTRACT

The present invention is directed to a water treatment or purification system and method for providing treated water in industrial, commercial and residential applications. The treatment system provides treated or softened water to a point of use by removing at least a portion of any hardness-causing species contained in water from a water source, such as municipal water, well water, brackish water and water containing foulants. The water treatment system includes an electrochemical device, such as an electrodeionization device, that can have at least one compartment that generates and traps hydrogen ions which can be used in another compartment of the electrochemical device such as, an electrode compartment, to reduce or at least dissolve any scale. Other applications of the system would be in the treatment and processing of foods and beverages, sugars, various industries such as the chemical, pharmaceutical, waste water treatment and power generating industries.

12 Claims, 3 Drawing Sheets

U.S. PATENT DOCUMENTS

| | | |
|---|---|---|
| 3,099,615 A | 7/1963 | Kollsman |
| 3,148,687 A | 9/1964 | Dosch |
| 3,149,061 A | 9/1964 | Parsi |
| 3,149,062 A | 9/1964 | Gottschal et al. |
| 3,165,460 A | 1/1965 | Zang et al. |
| 3,291,713 A | 12/1966 | Parsi |
| 3,330,750 A | 7/1967 | McRae et al. |
| 3,341,441 A | 9/1967 | Giuffrida et al. |
| 3,375,208 A | 3/1968 | Duddy |
| 3,627,703 A | 12/1971 | Kojima et al. |
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,102,752 A | 7/1978 | Rugh, II |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno et al. |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,808,287 A | 2/1989 | Hark |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| H1206 H | 7/1993 | Thibodeax et al. |
| 5,240,579 A | 8/1993 | Kedem |
| 5,254,227 A | 10/1993 | Cawlfield et al. |
| 5,259,936 A | 11/1993 | Ganzi |
| 5,286,354 A | 2/1994 | Bard et al. |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |

| | | |
|---|---|---|
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,056,878 A | 5/2000 | Tessier et al. |
| 6,099,716 A | 8/2000 | Molter et al. |
| 6,103,125 A | 8/2000 | Kuepper |
| 6,126,805 A | 10/2000 | Batchelder et al. |
| RE36,972 E | 11/2000 | Baker et al. |
| 6,146,524 A | 11/2000 | Story |
| 6,149,788 A | 11/2000 | Tessier et al. |
| 6,171,374 B1 | 1/2001 | Barton et al. |
| 6,187,154 B1 | 2/2001 | Yamaguchi et al. |
| 6,187,162 B1 | 2/2001 | Mir |
| 6,190,528 B1 | 2/2001 | Li et al. |
| 6,190,553 B1 | 2/2001 | Lee |
| 6,190,558 B1 | 2/2001 | Robbins |
| 6,193,869 B1 | 2/2001 | Towe et al. |
| 6,197,174 B1 | 3/2001 | Barber et al. |
| 6,197,189 B1 | 3/2001 | Schwartz et al. |
| 6,214,204 B1 | 4/2001 | Gadkaree et al. |
| 6,228,240 B1 | 5/2001 | Terada et al. |
| 6,235,166 B1 | 5/2001 | Towe et al. |
| 6,248,226 B1 | 6/2001 | Shinmei et al. |
| 6,254,741 B1 | 7/2001 | Stuart et al. |
| 6,258,278 B1 | 7/2001 | Tonelli et al. |
| 6,267,891 B1 | 7/2001 | Tonelli et al. |
| 6,274,019 B1 | 8/2001 | Kuwata |
| 6,284,124 B1 | 9/2001 | DiMascio et al. |
| 6,284,399 B1 | 9/2001 | Oko et al. |
| 6,296,751 B1 * | 10/2001 | Mir .............. 204/524 |
| 6,303,037 B1 | 10/2001 | Tamura et al. |
| 6,375,812 B1 | 4/2002 | Leonida |
| 6,402,916 B1 | 6/2002 | Sampson et al. |
| 6,402,917 B1 | 6/2002 | Emery et al. |
| 6,482,304 B1 | 11/2002 | Emery et al. |
| 6,607,647 B2 | 8/2003 | Wilkins et al. |
| 6,607,668 B2 | 8/2003 | Rela |
| 6,627,073 B2 | 9/2003 | Shimizu et al. |
| 6,648,307 B2 | 11/2003 | Nelson et al. |
| 6,649,037 B2 * | 11/2003 | Liang et al. .................. 204/632 |
| 6,766,812 B1 | 7/2004 | Gadini |
| 6,783,666 B2 | 8/2004 | Takeda et al. |
| 6,808,608 B2 | 10/2004 | Srinivasan et al. |
| 6,824,662 B2 | 11/2004 | Liang et al. |
| 2001/0003329 A1 | 6/2001 | Sugaya et al. |
| 2002/0092769 A1 | 7/2002 | Garcia et al. |
| 2002/0189951 A1 | 12/2002 | Liang et al. |
| 2003/0080467 A1 | 5/2003 | Andrews et al. |
| 2003/0089609 A1 | 5/2003 | Liang et al. |
| 2003/0098266 A1 | 5/2003 | Shiue et al. |
| 2003/0155243 A1 | 8/2003 | Sferrazza |
| 2003/0201235 A1 | 10/2003 | Chidambaran et al. |
| 2004/0079700 A1 | 4/2004 | Wood et al. |
| 2004/0089551 A1 | 5/2004 | Liang et al. |
| 2005/0109703 A1 | 5/2005 | Newenhizen |
| 2006/0060532 A1 | 3/2006 | Davis |
| 2006/0231403 A1 | 10/2006 | Riviello |

FOREIGN PATENT DOCUMENTS

| | | |
|---|---|---|
| CA | 2316012 A1 | 11/2001 |
| CN | 1044411 A | 8/1990 |
| DE | 1 201 055 | 9/1965 |
| DE | 3238280 A1 | 4/1984 |
| DE | 4016000 A1 | 11/1991 |
| DE | 44 18 812 A1 | 12/1995 |
| DE | 199 42 347 A1 | 3/2001 |
| EP | 0170895 A2 | 2/1986 |
| EP | 0 503 589 A1 | 9/1992 |
| EP | 0 621 072 A2 | 10/1994 |
| EP | 0 680 932 A2 | 11/1995 |
| EP | 0803474 A2 | 10/1997 |
| EP | 0 870 533 A1 | 10/1998 |
| EP | 1 068 901 A2 | 1/2001 |
| EP | 1068901 A2 | 1/2001 |
| EP | 1075 868 A2 | 2/2001 |
| EP | 1 101 790 A1 | 5/2001 |
| EP | 1 106 241 A1 | 6/2001 |
| EP | 1172145 A2 | 1/2002 |
| EP | 1222954 A1 | 7/2002 |
| EP | 1506941 A1 | 2/2005 |
| GB | 776469 | 6/1957 |
| GB | 877239 | 9/1961 |
| GB | 880344 | 10/1961 |
| GB | 893051 | 4/1962 |
| GB | 942762 | 11/1963 |
| GB | 1048026 | 11/1966 |
| GB | 1137679 | 12/1968 |
| GB | 1 381 681 A | 1/1975 |
| GB | 1448533 | 9/1976 |
| JP | 54-5888 | 1/1979 |
| JP | 07-155750 | 6/1995 |
| JP | 07-265865 | 10/1995 |
| JP | 09-253643 | 9/1997 |
| JP | 11-42483 | 2/1999 |
| JP | 2001-79358 | 3/2001 |
| JP | 2001-79553 | 3/2001 |
| JP | 2001-104960 | 4/2001 |
| JP | 2001-113137 | 4/2001 |
| JP | 2001-113279 | 4/2001 |
| JP | 2001-113280 | 4/2001 |
| JP | 2001-121152 | 5/2001 |
| JP | 2005007347 | 1/2005 |
| JP | 2005007348 | 1/2005 |
| RO | 114 874 B | 8/1999 |
| SU | 216622 | 11/1972 |
| SU | 990256 | 1/1983 |
| SU | 1118389 | 10/1984 |
| WO | WO 92/11089 | 7/1992 |
| WO | WO 95/32052 | 11/1995 |
| WO | WO 95/32791 | 12/1995 |
| WO | WO 96/22162 | 7/1996 |
| WO | WO 97/25147 | 7/1997 |
| WO | WO 97/46491 | 12/1997 |
| WO | WO 97/46492 | 12/1997 |
| WO | WO 98/11987 | 3/1998 |
| WO | WO 98/17590 | 4/1998 |
| WO | WO 98/20972 | 5/1998 |
| WO | WO 98/58727 A1 | 12/1998 |
| WO | WO 99/39810 | 8/1999 |
| WO | WO 00/30749 | 6/2000 |
| WO | WO 00/64325 A2 | 11/2000 |
| WO | WO 00/75082 A1 | 12/2000 |
| WO | WO 01/49397 A1 | 7/2001 |
| WO | WO 02/04357 A1 | 1/2002 |
| WO | WO 02/14224 A1 | 2/2002 |
| WO | WO 03/086590 A1 | 10/2003 |

OTHER PUBLICATIONS

Wood, J.H. et al., "Continuous Electrodeionisation: Module Design Considerations for the Production of High Purity Water," *Proc. Of IEX at the Millenium*, Jul. 6, 2000, pp. 44-51.

ASTM, "Standard Practice for Calculation and Adjustment of the Langelier Saturation Index for Reverse Osmosis," Designation: D3739-94 (Reapproved 1998), pp. 1-4.

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.

DiMascio et al., "Continuous Electrodeionization: Production of High-Purity Water without Regeneration Chemicals," The Electrochemical Society *Interface*, Fall 1998, pp. 26-29.

DiMascio et al., "Electrodiaresis Polishing (An Electrochemical Deionizataion Process)," date unknown, pp. 164-172.

Dow Chemical, "Dowex Marathon A Ion Exchange Resin," published Dec. 1999, Product Literature reprinted from www.dow.com.

Dow Chemical, "Dowex Marathon A2 Ion Exchange Resin," published Nov. 1998, Product Literature reprinted from www.dow.com.

Dupont Nafion PFSA Products, Technical Information, "Safe Handling and Use of Perfluorosulfonic Acid Products," Feb. 2004. 4 pages.

Farmer et al., Capacitive Deionization of $NH_4ClO_4$ Solutions with Carbon Aerogel Electrodes, *J. Appl. Electro-Chemistry*, vol. 26, (1996), pp. 1007-1018.

FDA, "Guide to Inspections of High Purity Water Systems," printed from www.fda.gov. on Mar. 30, 2004, date unknown.

Ganzi, G.C. et al., "Electrodeionization: Theory and Practice of Continuous Electrodeionization," *Ultrapure Water*, Jul./Aug. 1997, pp. 64-69.

G.J. Gittens et al., "The Application of Electrodialysis to Demineralisation," A.I.Ch.E.-I.Chem.E. Symposium Series No. 9, 1965 (London: Instn chem. Engrs), pp. 79-83.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183, publication and date unknown.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Laktionov, Evgueni Viktorovitch, "Déminéralisation De Solutions Électrolytiques Diluées. Analyse Comparative Des Performances De Differents Procédés D'Électrodialyse", Directeur de these, Université Montpellier II, Science Et Technique Du Languedoc, 17 Juillet 1998.

Matejka, "Continuous Production of High-Purity Water by Electro-Deionisation," *J. Appl. Chem., Biotechnol.*, vol. 21, Apr. 1971, pp.117-120.

Pourcelly, Gerald, Conductivity and selectivity of ion exchange membranes: structure-correlations, *Desalination*, vol. 147 (2002) pp. 359-361.

Purolite Technical Bulletin, Hypersol-Macronet™ Sorbent Resins, 1995.

V. Shaposhnik et al., "Demineralization of water by electrodialysis with ion-exchange membranes, grains and nets," *Desalination*, vol. 133, (2001), pp. 211-214.

R. Simons, "Strong Electric Field Effects on Proton Transfer Between Membrane-Bound Amines and Water," *Nature*, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158.

R. Simons, "Water Splitting In Ion Exchange Membranes," Pergamon Press Ltd., 1985, pp. 275-282.

R. Simons, "The Origin and Elimination of Water Splitting in Ion Exchange Membranes During Water Demineralisation By Electrodialysis," *Desalination*, vol. 28, Jan. 29, 1979, pp. 41-42.

USFilter, "H-Series Industrial CDI® Systems," product information, 1998, 4 pgs.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

\* cited by examiner

WATER TREATMENT SYSTEM AND METHOD

BACKGROUND OF THE INVENTION

1. Field of the Invention

The present invention relates generally to a system and method for treating or purifying a fluid and, more particularly, to a water treatment system incorporating a reservoir system and an electrochemical device that has a compartment that traps hydrogen ions that can be used in an electrode compartment to reduce scaling.

2. Description of the Related Art

Water that contains hardness species such as calcium and magnesium may be undesirable for some uses in industrial, commercial and household applications. The typical guidelines for a classification of water hardness are: zero to 60 milligrams per liter (mg/l) as calcium carbonate is classified as soft; 61 to 120 mg/l as moderately hard; 121 to 180 mg/l as hard; and more than 180 mg/l as very hard.

Hard water can be softened by removing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Other systems have been disclosed. For example, Dosch, in U.S. Pat. No. 3,148,687 teaches a washing machine including a water softening arrangement using ion exchange resins. Similarly, Gadini et al., in International Application Publication No. WO00/64325, disclose a household appliance using water with an improved device for reducing the water hardness. Gadini et al. teach of a household appliance having a control system, a water supply system from an external source and a softening system with an electrochemical cell.

Electrodeionization (EDI) is one process that may be used to soften water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charge. Such devices can cause electrochemical reactions designed to achieve or enhance performance. These devices also include electrically active membranes such as semi-permeable ion exchange or bipolar membranes.

Continuous electrodeionization (CEDI) is a process wherein the primary sizing parameter is the transport through the media, not the ionic capacity of the media. A typical CEDI device includes selectively-permeable anion and cation exchange membranes. The spaces between the membranes are configured to create liquid flow compartments with inlets and outlets. A transverse DC electrical field is imposed by an external power source using electrodes at the bounds of compartments. Often, electrode compartments are provided so that reaction product from the electrodes can be separated from the other flow compartments. Upon imposition of the electric field, ions in the liquid are typically attracted to their respective counter-electrodes. The adjoining compartments, bounded by the permeable membranes facing the anode and facing the cathode, typically become ionically depleted and the compartments, bounded by the electroactive cation permeable membrane facing the anode and the electroactive anion membrane facing the cathode, typically become ionically concentrated. The volume within the ion-depleting compartments and, in some embodiments, within the ion-concentrating compartments, can include electrically active media or electroactive media. In CEDI devices, the electroactive media may include intimately mixed anion and cation exchange resin beads to enhance the transport of ions within the compartments and may participate as substrates for electrochemical reactions. Electrodeionization devices have been described by, for example, Giuffrida et al. in U.S. Pat. Nos. 4,632,745, 4,925,541 and 5,211,823, by Ganzi in U.S. Pat. Nos. 5,259,936 and 5,316,637, by Oren et al. in U.S. Pat. No. 5,154,809 and by Kedem in U.S. Pat. No. 5,240,579.

SUMMARY OF THE INVENTION

In one aspect, the present invention provides a water treatment system. The system can comprise a water reservoir fluidly connected to a point of entry, an electrochemical device fluidly connected to the water reservoir and comprising a compartment that is at least partially filled with electroactive media and bounded by anion-selective membranes on each side thereof and a water distribution system fluidly connected to at least one of the water reservoirs and the electrochemical device.

In another embodiment, the present invention provides an electrochemical device comprising an ion-trapping compartment comprising cation-exchange resin and anion-selective membranes.

In another embodiment, the present invention provides an electrochemical device comprising a compartment comprising electroactive media that is substantially free of cation-exchange resin and is bounded by anion-selective membranes on each side thereof.

In another embodiment, the present invention provides an electrochemical device comprising a compartment consisting essentially of cation-exchange resin and anion-selective membranes.

In another embodiment, the present invention provides an electrochemical device electrochemical device comprising a compartment that is constructed and arranged to inhibit the migration of cations while promoting the migration of anions to an adjacent compartment.

In another embodiment, the present invention provides an electrochemical device comprising a first depleting compartment, an ion-trapping compartment comprising cation-exchange resin adjacent the first depleting compartment, an alkaline-collecting compartment positioned adjacent the ion-trapping compartment and a second depleting compartment positioned adjacent the alkaline-collecting compartment.

In another embodiment, the present invention provides an electrochemical device comprising an ion-exchange fiber disposed between ion-selective membranes.

In another embodiment, the present invention provides an electrochemical device comprising a depleting compartment and a concentrating compartment. At least one of the depleting and concentrating compartments comprises electroactive fiber felt.

In another embodiment, the present invention provides a method of treating a liquid. The method can comprise providing an electrochemical device comprising a depleting compartment, a concentrating compartment and an ion-trapping compartment disposed between the depleting and concentrating compartments, passing the liquid to be treated through the depleting compartment and collecting hydrogen ions in the ion-trapping compartment.

In another embodiment, the present invention provides a method of treating water. The method can comprise providing an electrochemical device comprising a compartment bounded by an ion-selective membrane, introducing water into the compartment, dissociating water into hydrogen and hydroxyl ions in the compartment and transferring at least a portion of the hydrogen ions to an electrode compartment of the electrochemical device.

In another embodiment, the present invention provides a method of facilitating liquid treatment. The method can comprise providing an electrochemical device comprising at least one compartment that is at least partially filled with cation-exchange resin and bounded by anion-selective membranes on each side thereof.

In another embodiment, the present invention provides a method of facilitating liquid treatment. The method can comprise providing an electrochemical device comprising a compartment consisting essentially of cation-exchange resin and anion-selective membranes.

Other advantages, novel features and objects of the invention will become apparent from the following detailed description of the invention when considered in conjunction with the accompanying drawings, which are schematic and not intended to be drawn to scale. In the Figures, each identical or substantially similar component that is illustrated is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

The preferred, non-limiting embodiments of the present invention will be described by way of example and with reference to the accompanying drawings, in which.

DETAILED DESCRIPTION OF THE INVENTION

United States Patent Applications titled WATER TREATMENT SYSTEM AND METHOD by Wilkins et al. and filed on even date herewith; WATER TREATMENT SYSTEM AND METHOD by Jha et al. and filed on even date herewith; WATER TREATMENT SYSTEM AND METHOD by Freydina et al. and filed on even date herewith; WATER TREATMENT SYSTEM AND METHOD by Wilkins et al. and filed on even date herewith; WATER TREATMENT SYSTEM AND METHOD by Freydina et al. and filed on even date herewith; WATER TREATMENT SYSTEM AND METHOD by Wilkins et al. and filed on even date herewith; and WATER TREATMENT SYSTEM AND METHOD by Jha et al. and filed on even date herewith are hereby incorporated by reference herein.

The present invention is directed to a water purification or treatment system and method for providing treated water in industrial, commercial and residential applications. The treatment system provides treated or softened water to a point of use by removing at least a portion of any hardness-causing species contained in water from a water source, such as municipal water, well water, brackish water and water containing foulants. The water treatment system can include an electrochemical device, such as electrodeionization device, that can have at least one compartment that generates and traps hydrogen ions in a fluid, which can be used in another compartment of the electrochemical device, such as an electrode compartment, to reduce or at least dissolve any scale. Other applications of the system of the present invention would be in the treatment and processing of foods and beverages, sugars, various industries such as the chemical, pharmaceutical, waste water treatment and power generating industries.

The treatment system of the present invention typically receives water from the water source or a point of entry and purifies the water containing at least some undesirable species before delivering the treated water to a point of use. The treatment system typically has a reservoir system in line, e.g., in fluid communication with an electrochemical device such as electrodeionization device. The treatment system, in some embodiments of the invention, further comprises a sensor for measuring at least one property of the water or an operating condition of the treatment system. In other embodiments of the present invention, the treatment system also includes a controller for adjusting or regulating at least one operating parameter of the treatment system or a component of the treatment system.

Figure 1:
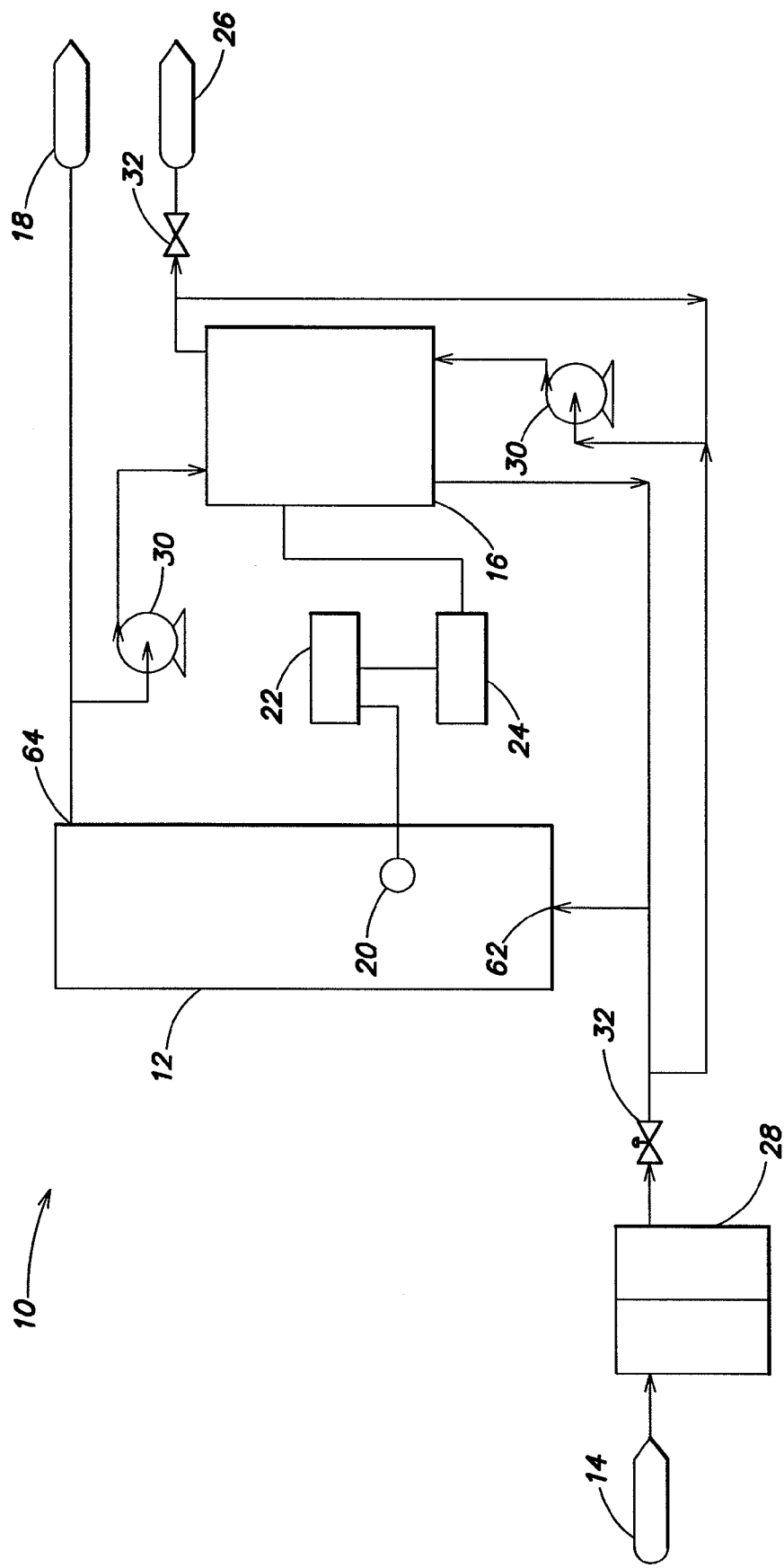
FIG. 1 is a process flow diagram of a water treatment system according to one or more embodiments of the present invention showing a reservoir system fluidly connected to a point of entry and to an electrochemical device.

FIG. 1 shows a schematic flow diagram of the present invention of a water treatment system according to one embodiment. The water treatment system 10 includes a reservoir system 12 fluidly connected, typically at an upstream end, to a water source or a point of entry 14 and also to an electrochemical device, e.g. electrodeionization device 16, typically at a downstream end. Water treatment system 10 typically includes a point of use 18, which is typically fluidly connected downstream of reservoir system 12. In certain embodiments, water treatment system 10 also has a sensor 20 and a controller 22 for controlling or regulating power source 24 which provides power to electrodeionization device 16. Electrodeionization device 16 typically removes or reduces the concentration of undesirable species from water to be treated flowing from point of entry 14 to produce treated water for storage into reservoir system 12 and ultimate delivery to point of use 18. Undesirable species removed by electrodeionization device 16 is typically transferred in a concentrate stream to an auxiliary use or a drain 26.

Water treatment system 10, in certain embodiments of the invention, can further include pretreatment system 28, which is typically fluidly connected upstream of reservoir system 12 or electrodeionization device 16. Moreover, water treatment system 10 typically also includes fluid control components, such as pumps 30 and valves 32.

The present invention will be further understood in light of the following definitions. As used herein, "pressurized" refers to a system or component that has a pressure, internal or applied, that is above atmospheric pressure. For example, a pressurized reservoir system has an internal pressure that is greater than atmospheric pressure.

Figure 2:
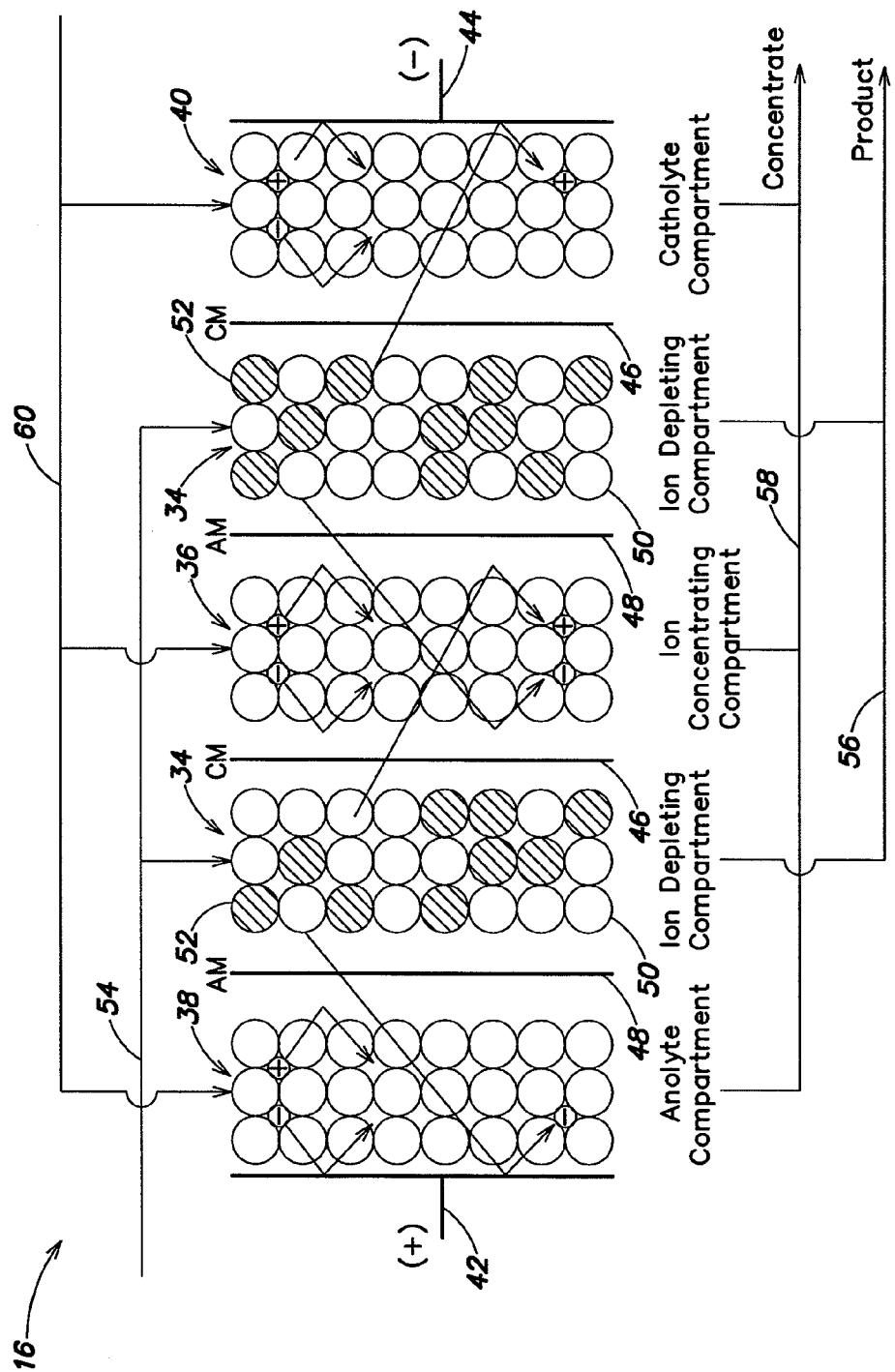
FIG. 2 is a schematic, sectional view through a typical electrodeionization device illustrating the fluid and ion flow directions through depleting and concentrating compartments in accordance with one or more embodiments of the present invention.

FIG. 2 schematically shows a cross-sectional view of fluid and ion flow paths of an electrodeionization device through one embodiment of the present invention. The electrodeionization device or device 16 includes ion-depleting (depleting) compartments 34 and ion-concentrating (concentrating) compartments 36, positioned between depleting compartments 34. Typically, end blocks (not shown) are positioned adjacent to end plates (not shown) to house an anode 42 and a cathode 44 in their respective compartments. In certain embodiments, the compartments include cation-selective membranes 46 and anion-selective membranes 48, which are typically peripherally sealed to the periphery of both sides of the compartments.

The cation-selective membranes and anion-selective membranes are typically comprised of an ion exchange powder, a polyethylene powder binder and a glycerin lubricant. In some embodiments, the cation- and anion-selective membranes are heterogeneous polyolefin-based membranes, which are typically extruded by a thermoplastic process using heat and pressure to create a composite sheet. The use of other membranes such as homogeneous membranes, alone or in combination with heterogeneous membranes, is further contemplated by the present invention. Representative suitable ion-selective membranes include, for example, web supported using styrene-divinyl benzene with sulphonic acid or quaternary ammonium functional groups, web supported using styrene-divinyl benzene in a polyvinylidene fluoride binder, and unsupported-sulfonated styrene and quarternized vinyl benzyl amine grafts on polyethylene sheet.

Concentrating compartments 36 are typically filled with cation exchange resin 50 and depleting compartments 34 are typically filled with a mixture of cation exchange resin 50 and anion exchange resin 52. In some embodiments, the cation exchange and anion exchange resins can be arranged in layers within any of the depleting, concentrating and electrode compartments so that a number of layers in a variety of arrangements can be assembled. Other embodiments are believed to be within the scope of the invention including, for example, the use of mixed bed ion exchange resins in any of the depleting, concentrating and electrode compartments, the use of inert resin between layer beds of anionic and cationic exchange resins, the use of various types and arrangements of anionic and cationic resins including, but not limited to, those described by DiMascio et al., in U.S. Pat. No. 5,858,191, which is incorporated herein by reference in its entirety.

In operation, a liquid to be treated 54, typically from an upstream water source entering the treatment system at point of entry 14, having dissolved cationic and anionic components, including hardness ion species, can be introduced into depleting compartments 34 through a manifold 60, wherein the cationic components are attracted to the cation exchange resin 50 and the anionic components are attracted to the anion exchange resin 52. An electric field applied across electrodeionization device 16, through anode 42 and cathode 44, which are typically positioned on opposite ends of electrodeionization device 16, typically passes perpendicularly relative to the fluid flow direction such that cationic and anionic components in the liquid tend to migrate in a direction corresponding to their attracting electrodes.

Cationic components typically migrate through cation-selective membrane 46 into adjacent concentrating compartment 36. Anion-selective membrane 48, positioned on the opposite side of concentrating compartment 36, can prevent migration into adjacent compartments, thereby trapping the cationic components in the concentrating compartment. Similarly, anionic components typically migrate through the ion-selective membranes, but in a direction that is opposite relative to the migration direction of the cationic components. Anionic components migrate through anion-selective membrane 48, from depleting compartment 34, into an adjacent concentrating compartment 36. Cation-selective membrane 46, positioned on the other side of concentrating compartment 36, can prevent further migration, thus trapping anionic components in the concentrating compartment. In net effect, ionic components are removed or depleted from liquid 54 in depleting compartments 34 and collected in concentrating compartments 36 resulting in a treated water product stream 56 and a concentrate or discharge stream 58.

In accordance with some embodiments of the present invention, the applied electric field across electrodeionization device 16 can create a polarization phenomenon, which can lead to the dissociation of water into hydrogen and hydroxyl ions. The hydrogen and hydroxyl ions can regenerate the ion exchange resins 50 and 52 in ion-depleting compartments 34, so that removal of dissolved ionic components can occur continuously and without a separate step for regenerating exhausted ion exchange resins because of the ionic species migration. The applied electric field across electrodeionization device 16 is typically a direct current. However, any applied electric field that creates a bias or a potential difference between one electrode and another can be used to promote migration of ionic species. Therefore, an alternating current may be used, provided that there is a potential difference between electrodes that is sufficient to attract cationic and anionic species to the respective attracting electrodes. In yet another embodiment of the present invention, an alternating current may be rectified, for example, by using a diode or a bridge rectifier, to convert an alternating current to a pulsating direct current such that, when the current is applied across the electrodeionization device, a potential gradient is created that attracts the respective ionic species.

The electroactive media, for example, the ion exchange resin beads 50 and 52, typically utilized in depleting compartments 34, can have a variety of functional groups on their surface regions, such as tertiary, alkyl amino groups and dimethyl ethanolamine. These materials can also be used in combinations with ion exchange resin materials having various functional groups on their surface regions, such as quaternary ammonium groups. The electroactive media can comprise a fiber or felt material comprising functional groups on a surface thereof. The use of ion-exchange fiber can ease assembly and replacement of such spent electroactive media. In some embodiments, the ion-exchange fiber comprises positively charged or negatively charged, or both, species bound to a matrix. The matrix can be a fibrous felt comprising, for example, a polymeric material such as, but not limited to, a polyolefin like polypropylene, polyethylene or polystyrene. Examples of fiber felt media include those available from the Smoptech Corporation or Johnson Matthey Inc., Wayne, Pa. In accordance with further embodiments of the present invention, the electrochemical device can comprise ion exchange membranes having surface textures or three-dimensional aspects that define projections, which may, in some cases, contact adjacent ion exchange membranes with or without three-dimensional aspects. Such features can promote mixing of fluid flowing adjacently, which may inhibit formation of deposits.

Reservoir system 12 can store or accumulate water from point of entry 14 or a water source and may also serve to store softened or treated water from product stream 56 from electrodeionization device 16 and provide water, typically treated water or treated water mixed with water from point of entry 14 to point of use 18 through a distribution system. In one embodiment, reservoir system 12 is a pressurized reservoir system. Pressure in the pressurized reservoir system can be created by various methods and techniques, for example, by pressurizing the water with a pump or by elevating the water source, thus creating head pressure.

In accordance some embodiments of the present invention, reservoir system 12 comprises a pressurized vessel or a vessel that has inlets and outlets for fluid flow such as an inlet 62 and an outlet 64. Inlet 62 is typically fluidly connected to point of entry 14 and outlet 64 is typically fluidly connected to a water distribution system or to point of use 18. Reservoir system 12 can have several vessels or vessels having several inlets positioned at various locations on each vessel. Similarly, outlet 64 may be positioned on each vessel at various locations depending on, among other things, demand or flow rate to point of use 18, capacity or efficiency of electrodeionization device 16 and capacity or hold-up of reservoir system 12. Reservoir system 12 may further comprise various components or elements that perform desirable functions or avoid undesirable consequences. For example, reservoir system 12 can have vessels having internal components, such as baffles that are positioned to disrupt any internal flow currents within the vessels of reservoir system 12. In some embodiments, reservoir system 12 has a heat exchanger for heating or cooling the fluid. For example, reservoir system 12 may comprise a vessel with a heating coil, which can have a heating fluid at an elevated temperature. The heating fluid may be hot water in closed-loop flow with a heating unit operation such as a furnace so that when the heating fluid temperature is raised in the furnace, the temperature of the water in the vessel increases through heat transfer. Other examples of auxiliary or additional components include, but are not limited to, pressure relief valves designed to relieve internal pressure of any vessels and avoid or at least reduce the likelihood of vessel rupture and thermal expansion tanks that are suitable for maintaining a desired system operating pressure. The size and capacity of a thermal expansion tank will depend on factors including, but not limited to, the total volume of water, the operating temperature and pressure of the reservoir system.

In operation, reservoir system 12 is typically connected downstream of point of entry 14 and fluidly connected in-line, such as in a recirculation loop, with electrodeionization device 16. For example, water from point of entry 14 can flow into inlet 62 and can mix with the bulk water contained within reservoir system 12. Water can exit reservoir system 12, typically through outlet 64, and directed to point of use 18 or through pump 30 into electrodeionization device 16 for treatment or removal of any undesirable species. Treated water leaving electrodeionization device 16 may mix with water from point of entry 14 and enter reservoir system 12 through inlet 62. In this way, a loop is formed between reservoir system 12 and electrodeionization device 16 and feedwater from point of entry 14 can replenish water demand created by and flowing to point of use 18.

Point of entry 14 provides water from a water source or connects the water source to the water treatment system. The water source may be a potable water source, such as municipal water or well water or it may be a non-potable, such as a brackish or salt-water source. Typically, an intermediate treatment or treatment system purifies the water for human consumption before reaching point of entry 14. The water typically contains dissolved salts or ionic or ionizable species including sodium, chloride, calcium ions, magnesium ions, carbonates, sulfates or other insoluble or semi-soluble species or dissolved gases, such as silica and carbon dioxide. Moreover, the water may contain additives, such as but not limited to fluoride, chlorate and bromate species.

In accordance with another embodiment of the present invention, water treatment system 10 includes to a water distribution system, which in turn connects to a point of use. The water distribution system may comprise components that are fluidly connected to provide pressurized water, typically treated water, from reservoir system 12 to point of use 18. The water distribution system may comprise an arrangement of pipes, valves, tees, pumps and manifolds to provide water from reservoir system 12 to one or several points of use 18 or to any component of water treatment system 10.

Point of use 18 is typically any device or appliance that requires or demands water. For example, point of use 18 may be an appliance, such as a washing machine or a dishwasher, or may be a faucet serving to provide water to a kitchen sink or a showerhead. In another embodiment, point of use 18 comprises a system for providing water suitable for household or residential use. In another embodiment, water treatment system 10 also comprises a sensor, typically a water property sensor, which measures at least one physical property of the water in water treatment system 10. For example, sensor 20 may be a sensor that can measure turbidity, alkalinity, water conductivity, pH, temperature, pressure or flow rate. Sensor 20 may be installed or positioned within water treatment system 10 to measure a particularly preferred water property. For example, sensor 20 may be a water conductivity sensor installed in reservoir system 12 so that sensor 20 measures the conductivity of the water, which indirectly measures the quality of the water available for service in point of use 18. In another embodiment, sensor 20 may comprise a series or a set of sensors in reservoir system 12. The set of sensors may be arranged and connected to controller 22 so that the quality of water in reservoir system 12 is monitored, intermittently or continuously through controller 22, and the quality of water or the operation of electrodeionization device 16 can be optimized as described below. Other embodiments may comprise a combination of sets of sensors in various locations throughout water treatment system 10. For example, sensor 20 may be a flow sensor measuring a flow rate to a point of use 18 and further include any of a nephelometer, pH, temperature and pressure sensor monitoring the operating condition of water treatment system 10.

In accordance with another embodiment of the present invention, water treatment system 10 further comprises a pretreatment system 28 designed to remove a portion of any undesirable species from the water before the water is introduced to, for example, reservoir system 12 or electrodeionization device 16. Examples of pretreatment systems include, but are not limited to, reverse osmosis devices, which are typically used to desalinate brackish or salt water. Carbon or charcoal filters, as components of pretreatment systems, may be necessary to remove at least a portion of any chlorine or any species that may foul or interfere with the operation of electrodeionization device 16.

Pretreatment system 28 may be positioned anywhere within water treatment system 10. For example, pretreatment system 28 may be positioned upstream of reservoir system 12 or downstream of pressurized system 12 but upstream of electrodeionization device 16 so that at least some chlorine species are retained in reservoir system 12 but are removed before the water enters electrodeionization device 16.

In accordance with one or more embodiments of the present invention, water treatment system 10 further comprises a controller 22 that is capable of monitoring and regulating the operating conditions of water treatment system 10 and its components. Controller 22 typically comprises a microprocessor-based device, such as a programmable logic controller (PLC) or a distributed control system that receives or sends input and output signals to components of water treatment system 10. For example, controller 22 may be a PLC that sends a signal to power source 24, which supplies power to electrodeionization device 16 or may provide a signal to a motor control center that provides power to pumps 30. In certain embodiments, controller 22 regulates the operating conditions of water treatment system 10 in open-loop or closed-loop control scheme. For example, controller 22, in open-loop control, may provide signals to the water treatment system such that water is treated without measuring any operating condition. Controller 22 may control the operating conditions in closed-loop control so that operating parameters may be adjusted depending on a measured operating condition. In yet another embodiment, controller 22 may further comprise a communication system such as a remote communication device for transmitting or sending any of measured operating condition or operating parameter to a remote station.

In accordance with another embodiment of the present invention, controller 22 may provide a signal that actuates any valves 32 in water treatment system 10 so that fluid flow in water treatment system 10 is controlled, adjusted or adjustable based on a variety of parameters including, but not limited to, the quality of water from point of entry 14, the quality of water to point of use 18, the demand or quantity of water to point of use 18, the operating efficiency or capacity of electrodeionization device 16, or any of a variety of operating conditions, such as the water conductivity, pH, temperature, pressure, composition and flow rate. In one embodiment of the present invention, controller 22 receives signals from sensor 20 so that controller 22 is capable of monitoring the operating parameters of water treatment system 10. Sensor 20 may be a water conductivity sensor positioned within reservoir system 12 so that the water conductivity in reservoir system 12 is monitored by controller 22. Controller 22 can, based on the water quality measured by sensor 20, control power source 24, which provides an electric field to electrodeionization device 16. In operation, controller 22 can increase, decrease or otherwise adjust the voltage, current, or both, supplied to electrodeionization device 16.

In another embodiment, controller 22 may reverse the direction of the applied field from power source 24 to electrodeionization device 16 according to a predetermined schedule or according to an operating condition, such as the water quality or any other operating parameter. Polarity reversal, which has been described by, for example, Giuffrida et al., in U.S. Pat. No. 4,956,071, and which is incorporated herein by reference in its entirety, is considered to be encompassed within the scope of the present invention.

Controller 22 may be configured or configurable by programming or may be self-adjusting such that it is capable of maximizing any of the service life and the efficiency of or reducing the operating cost of water treatment system 10. For example, controller 22 may comprise a microprocessor having user-selectable set points or self-adjusting set points that adjusts the applied voltage and current to electrodeionization device 16, the flow rate through the concentrating and depleting compartments of the electrodeionization device or the flow rate of discharge stream to drain 26 from the electrodeionization device or the pretreatment system or both. In another embodiment of the present invention, controller 22 may be programmed to be capable of adjusting a change in a cycle of electrodeionization device 16. For example, controller 22 may control the period between plurality reversal of an applied electric field across the electrodeionization device based on a measured water property such as, but not limited to, the conductivity of the water being delivered to the point of use. In another embodiment, controller 22 can calculate a Langelier Saturation Index (LSI) of the water in reservoir system 12 and adjust an operating parameter of the system 10 based on the difference between the calculated LSI and a set point. LSI can be calculated according to, for example, ASTM D 3739. Thus, in one embodiment, the treatment system can treat a liquid to produce treated liquid, for example, treated water having a low LSI of less than about 2, preferably less than about 1 and more preferably less than about zero. In other cases, the treatment system can produce liquid that has a low conductivity of less than about 300 µS/cm, preferably less than about 220 µS/cm and more preferably, less than about 200 µS/cm.

Controller 22 can incorporate dead band control to reduce the likelihood of unstable on/off control or chattering. Dead band refers to the range of signal outputs that a sensor provides without necessarily triggering a control signal. The dead band may reside, in some embodiments of the invention, intrinsically in one or more components of the system such as the sensor or may be programmed as part of the control system, or both. Dead band control can avoid unnecessary intermittent operation by smoothing out measurement excursions. Such control techniques can prolong the operating life or mean time before failure of the components of water treatment system 10. Other techniques that can be used include the use of voting, time-smoothing or time-averaging measurements or combinations thereof.

Accordingly, in accordance with one or more embodiments of the present invention, the water treatment system stores water from point of entry 14, which is typically connected to a water source at a pressure above atmospheric pressure in a first zone of reservoir system 12. Reservoir system 12 is typically fluidly connected to a water distribution system that transfers treated water to point of use 18. Water treatment system 18 can also have an electrodeionization device 16 that purifies water from point of entry 14 by removing at least a portion of any undesirable species to produce treated water that is introduced into reservoir system 12 in a second zone of reservoir system 12. First and second zones of reservoir system 12 are monitored by at least one water quality sensor, more preferably, a set of water quality sensors connected to controller 22, which, in turn, adjusts an operating parameter of electrodeionization device 16. In this way, controller 22 can monitor the first and second zones of reservoir system 12 and regulate the operation of electrodeionization device 16 depending on any of the properties measured by a sensor or a set of sensors 20 which measures the water properties of the water in the first and second zones.

In yet another embodiment of the present invention, controller 22, through sensor or set of sensors 20, can monitor and/or measure a water property of the water in the first and second zones of reservoir system 12 and also monitor and/or measure a flow rate flowing into at least one point of use 18 and adjust an operating parameter of electrodeionization device 16 based on the measured properties. For example, when an increased flow rate is measured or determined to point of use 18, controller 22 can adjust an operating parameter of electrodeionization device 16 to treat water to compensate for additional demand flowing into point of use 18. In other cases, controller 22 can adjust an operating parameter of electrodeionization device 16 depending on the volume in the first and second zones of reservoir system 12 and a historical demand required by point of use 18. The historical demand of a point of use can be determined by monitoring the usage at such point of use of over a period of time.

In accordance with another embodiment of the present invention, controller 22 regulates the operation of the water treatment system by incorporating adaptive or predictive algorithms, which are capable of monitoring demand and water quality and adjusting the operation of the electrodeionization device, such as increasing or decreasing the applied voltage or the period between electric field reversals of electrodeionization device 16. For example, controller 22 may be predictive in anticipating higher demand for treated water during early morning hours in a residential application to supply point of use 18 serving as a showerhead.

In accordance with another embodiment of the present invention, electrodeionization device 16 includes a compartment that can accumulate hydrogen ions while treating water. The hydrogen ions can be generated, in one embodiment, when an electric field is applied that can create a polarization phenomenon so that water flowing within the compartment is, at least partially, dissociated into hydrogen and hydroxyl ions. Under the proper operating conditions, water splitting can be effected by applying an electric field so that a current can pass through the electrodeionization device at a level that is above the limiting current density. Water splitting has been discussed by, for example, Zang et al., in U.S. Pat. No. 3,165,460, Batchelder et al., in U.S. Pat. No. 5,503,729, Denoncourt et al., in U.S. Pat. No. 5,593,563, Ganzi et al., in U.S. Pat. No. 5,858,915, Batchelder et al., in U.S. Pat. No. 5,679,228, Goldstein et al., in U.S. Pat. No. 5,679,229, Su et al., in U.S. Pat. No. 5,837,124 and Mir, in U.S. Pat. No. 6,187,162, each of which are incorporated herein by reference in their entireties. In another embodiment, the present invention provides an electrodeionization device wherein, under an applied electric field, the limiting current density is applied only in the specific compartments so that water is split only in such compartments.

In accordance with another embodiment, the present invention provides an electrodeionization device comprising an ion-trapping (trapping) compartment. The trapping compartment can comprise selectively permeable membranes that preferentially allow specific ions to pass therethrough. The membrane can be an anion-selective membrane and the trapping compartment can be bounded by anion-selective membranes on both sides thereof. In another embodiment of the present invention, the trapping compartment further comprises electroactive media disposed with the region of the trapping compartment between anion-selective membranes. The electroactive media can be ion-exchange resin that can ionically bind a free ionic species. The ionic species can be positively or negatively charged and the resin can have a bound charged species that attractively binds the free ionic species. The electroactive media can be anion exchange resin or cation exchange resin or a mixture thereof. If cation exchange resin predominates in the electroactive media, then there should higher relative retention, by ionic binding for example, of positively charged cationic species. If anion-selective membranes surround the electroactive media that is predominantly cation exchange resin, then the migration of positively charged cations is further inhibited. This should result in a higher relative concentration of retained cations in such a trapping compartment compared to negatively charged anionic species. Thus, in one embodiment of the present invention, electrodeionization device 16 is operated to split water to hydrogen and hydroxyl ions in a compartment that comprises electroactive media that is predominantly comprised of cation-exchange resin and bounded by anion-selective membranes. In certain embodiments of the present invention, the trapping compartments have adjacent collecting compartments. Such collecting compartments can collect the migrating anionic species that can migrate from the trapping compartment. The collecting compartment similarly can have electroactive media, which can be anion exchange resin, cation exchange resin or mixtures thereof.

The function and advantage of these and other embodiments of the present invention will be more fully understood from the example below. The following example is intended to illustrate the benefits of the present invention, but does not encompass the full scope of the invention.

EXAMPLE

Figure 3:
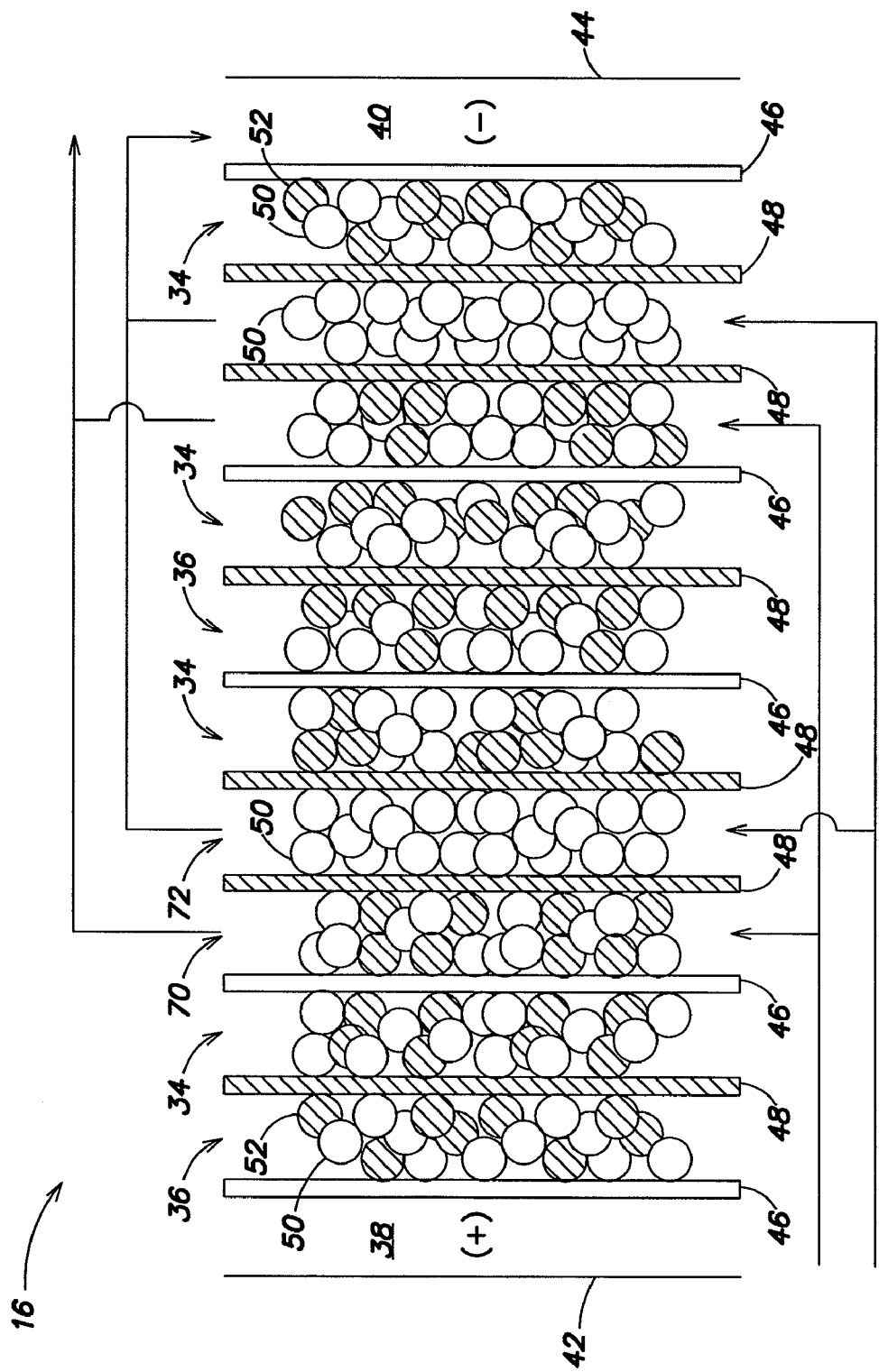
FIG. 3 is a schematic, sectional view through an electrodeionization device illustrating an ion-trapping compartment in accordance with one or more embodiments of the present invention.

This example demonstrates an electrodeionization device that can generate and accumulated hydrogen ions in a compartment. A section of the electrodeionization device used in this example is schematically illustrated in FIG. 3. The electrodeionization device 16 had five cell pairs totaling ten compartments between the electrode compartments 38 and 40. Cathode compartment 38 was bounded by a cation-selective membrane 46. An adjacent compartment, concentrating compartment 36, was filled with a mixture of cation-exchanged resin 50 and anion-exchange resin 52. Specifically, the electroactive media was a mixed bed of about 60% AMBERLITE® IRA 458 and about 40% AMBERLITE® SF 120 resin, both available from Rohm & Haas Company, Philadelphia, Pa. Concentrating compartment 36, immediately adjacent to cathode compartment 38, was bounded by cation-selective membrane 46 and an anion-selective membrane 48 opposite the cation-selective membrane. Immediately adjacent to concentrating compartment 36 was a depleting compartment 34, which was bounded by an anion-selective membrane 48 and a cation-selective membrane 46. Depleting compartment 34 comprised of a mixed bed resin similar in composition to the mixed bed resin comprising concentrating compartment 36. Positioned adjacent to compartment 34 were compartments 70 and 72. Compartment 72 was a trapping compartment that comprised of cation-exchange resin 50 bordered by anion-selective membranes 48. Compartment 70 comprised of a mixed bed of ion exchange resin with similar concentrations as the resins in compartments 34 and 36. On the other side of compartment 72 was a second depleting compartment 34 comprised of a mixed bed of ion exchange resin of similar composition as the first depleting compartment 34. The remaining compartments of electrodeionization device 16 comprised of depleting and concentrating compartments, as well as compartments 70 and 72 in the similar order as described above.

During operation, water to be treated was introduced into depleting compartments 34 and a flushing fluid, which was typically a concentrate stream, flowed in concentrating compartments 36. A second flushing fluid flowed into compartment 70 and was discharged as reject along with the fluid from concentrating compartments. A separate fluid flowed into compartment 72 and commonly collected and eventually was reintroduced into the cathode compartment 40. The fluid from the cathode compartment was discharged to drain. Under the influence of an applied electric field, water was split in compartment 72 into hydrogen and hydroxyl ions. Cation-exchange resin 50 in compartment 72 inhibited transport of the positively charged hydrogen ions. Anion-selective membrane 48, forming the boundaries with compartment 72 further inhibited any migration of hydrogen ions from compartment 72. Over time, hydrogen ion concentration increased relative to the hydroxyl ion concentration because the arrangement of electroactive media in compartment 72, consisting essentially of cation-exchange resin and bounded by anion-selective membranes, promoted migration of hydroxyl ions into adjacent compartment 70 while inhibiting hydrogen ion transport.

Electrodeionization device 16 was operated with an applied electric field of about 10 V to about 20 V. Water to be treated was introduced at a rate of about 0.03 liters per minute per cell at a pressure of about 12 psig. Tables 1 and 2 summarize the measured parameters of various streams during operation of the electrodeionization device at about 10 V with about 0.23 A and about 0.22 A, respectively, using feed water having a conductivity of about 784 µS/cm and about 775 µS/cm, respectively. Tables 3 and 4 summarize the measured parameters of various streams during operation of the electrodeionization device at about 20 V with about 0.35 A and about 0.32 A, respectively, using feed water having a conductivity of about 680 μS/cm and about 722 μS/cm, respectively.

The data presented in Tables 1-4 summarize measured properties of the various streams during the operation of electrodeionization device 16. The last two columns of each table lists the measured fluid properties of water leaving the electrode compartment. Specifically, in the next to last column of each table, feed water was introduced into the cathode compartment and the measured physical properties of the stream leaving that compartment are listed. In comparison, in the last column, fluid from compartment 72 was introduced into the cathode compartment and the properties of the fluid leaving that compartment are listed. The data shows that using fluid from compartment 72 wherein hydrogen was collected from water splitting and introduced into the electrode compartment, the measured LSI was lower than the LSI measured without using the fluid from compartment 72. This is significant because an LSI that is close to zero indicates a lesser likelihood of scaling. Thus, the Example shows that the use of the present invention can reduce the likelihood of scaling in an electrodeionization device.

TABLE 1

|  | Dilute | Concentrate | Reject | Electrode without Ion-trapping | Electrode with Ion-trapping |
| --- | --- | --- | --- | --- | --- |
| Conductivity (μS/cm) | 308 | 1195 | 1300 | 786 | 769 |
| pH | 7.9 | 7.8 | 8.5 | 9.1 | 8.4 |
| LSI | −0.51 | 0.38 | 1.09 | 1.47 | 0.64 |

TABLE 2

|  | Dilute | Concentrate | Reject | Electrode without Ion-trapping | Electrode with Ion-trapping |
| --- | --- | --- | --- | --- | --- |
| Conductivity (μS/cm) | 285 | 1192 | 1176 | 779 | 763 |
| pH | 8.0 | 7.8 | 8.4 | 9.4 | 8.3 |
| LSI | −0.48 | 0.42 | 1.09 | 1.48 | 0.55 |

TABLE 3

|  | Dilute | Concentrate | Reject | Electrode without Ion-trapping | Electrode with Ion-trapping |
| --- | --- | --- | --- | --- | --- |
| Conductivity (μS/cm) | 161 | 1255 | 1203 | 635 | 717 |
| pH | 7.4 | 7.1 | 8.7 | 9.7 | 8.2 |
| LSI | −1.46 | −0.21 | 1.48 | 1.72 | 0.48 |

TABLE 4

|  | Dilute | Concentrate | Reject | Electrode without Ion-trapping | Electrode with Ion-trapping |
| --- | --- | --- | --- | --- | --- |
| Conductivity (μS/cm) | 150 | 1398 | 1434 | 717 | 787 |
| pH | 7.2 | 6.8 | 8.6 | 9.8 | 7.9 |
| LSI | −1.79 | −0.55 | 1.47 | 1.77 | 0.11 |

Those skilled in the art should appreciate that all parameters and configurations described herein are meant to be exemplary and that actual parameters and configurations will depend upon the specific application in which the systems and methods of the present invention are used. Those skilled in the art should recognize, or be able to ascertain, using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. For example, where reference is made to an electrodeionization device, the systems and techniques of the present invention may be applicable to or utilize any electrochemical device such as, but not limited to electrodeionization devices, electrodialysis devices, and, in some cases, capacitive deionization devices. The present invention is directed to each feature, system, or method described herein. In addition, any combination of two or more features, systems or methods, if such features, systems or methods are not mutually inconsistent, is considered to be within the scope of the present invention. The present invention has been described using water as the liquid but should not be limited as such. For example, where reference is made to treated water, it is believed that other fluids can be treated in the system or according to the method of the present invention. Moreover, where reference is made to a component of the system, or to a step of the method, of the present invention that adjusts, modifies, measures or operates on water or water property, the present invention is believed to be applicable as well. Thus, the fluid to be treated may be a mixture comprising water.

What is claimed is:

1. An electrochemical device comprising:
    a first compartment comprising electroactive media that is substantially free of anion-exchange resin and is bounded by a first anion-selective membrane and a second anion-selective membrane;
    a second compartment disposed adjacent the first compartment, the second compartment defined at least partially by a first cation-selective membrane and the first anion-selective membrane, and the second compartment comprising a first mixed bed of cation exchange resin and anion exchange resin;
    a first depleting compartment disposed adjacent the second compartment, the first depleting compartment defined at least partially by the first cation-selective membrane and a third anion-selective membrane;
    a concentrating compartment disposed adjacent the first depleting compartment, the concentrating compartment defined at least partially by the third anion-selective membrane;
    a second depleting compartment disposed adjacent the first compartment, the second depleting compartment defined at least partially by the second anion-selective membrane and a second cation-selective membrane; and
    a cathode compartment fluidly connected downstream from the first compartment.

2. The electrochemical device of claim 1, wherein the first depleting compartment comprises a second mixed bed of cation exchange resin and anion exchange resin.

3. The electrochemical device of claim 2, wherein the second depleting compartment comprises a third mixed bed of cation exchange resin and anion exchange resin.

4. The electrochemical device of claim 3, wherein the cathode compartment is in ionic communication with the first compartment through the second depleting compartment.

5. The electrochemical device of claim 1, wherein the first depleting compartment is fluidly connected downstream of a pressurized reservoir.

6. The electrochemical device of claim 5, wherein the pressurized reservoir is fluidly connected to at least one of a washing machine, a faucet serving to provide water to a kitchen sink, and a showerhead.

7. A method of facilitating liquid treatment comprising:

providing an electrochemical device having a first compartment comprising electroactive media that is substantially free of anion-exchange resin and is bounded by a first anion-selective membrane and a second anion-selective membrane; a second compartment disposed adjacent the first compartment, the second compartment defined at least partially by a first cation-selective membrane and the first anion-selective membrane, and the second compartment comprising a first mixed bed of cation exchange resin and anion exchange resin; a first depleting compartment disposed adjacent the second compartment, the first depleting compartment defined at least partially by the first cation-selective membrane and a third anion-selective membrane; a concentrating compartment disposed adjacent the first depleting compartment, the concentrating compartment defined at least partially by the third anion-selective membrane; a second depleting compartment disposed adjacent the first compartment, the second depleting compartment defined at least partially by the second anion-selective membrane and a second cation-selective membrane; and connecting a power supply to the electrochemical device, the power supply configured to provide a reversible electrical current to the electrochemical device.

8. The method of claim 7, further comprising connecting the electrochemical device to a pressurizable reservoir which is fluidly connectable to at least one of a washing machine, a faucet serving to provide water to a kitchen sink, and a showerhead.

9. The method of claim 7, further comprising providing a controller configured to regulate operation of the power supply to provide the reversible electrical current to the electrochemical device that produces a treated liquid product having a conductivity in a range of from 150 µS/cm to 300 µS/cm.

10. The method of claim 9, further comprising connecting a conductivity sensor to the controller.

11. The method of claim 10, further comprising connecting the electrochemical device to a pressurizable reservoir.

12. The method of claim 11, wherein connecting the conductivity sensor comprises installing the conductivity sensor on the pressurizable reservoir.

* * * * *

UNITED STATES PATENT AND TRADEMARK OFFICE
CERTIFICATE OF CORRECTION

PATENT NO. : 7,604,725 B2
APPLICATION NO. : 10/712250
DATED : October 20, 2009
INVENTOR(S) : Ganzi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1235 days.

Signed and Sealed this

Fifth Day of October, 2010

David J. Kappos
*Director of the United States Patent and Trademark Office*